United States Patent [19]

Kataoka et al.

[11] 4,274,101

[45] Jun. 16, 1981

[54] LASER RECORDER WITH PIEZOELECTRIC BIMORPH FOCAL LENGTH VIBRATOR

[75] Inventors: Keiji Kataoka, Kawagoe; Kimio Tatsuno, Kokubunji; Susumu Saito, Hachioji, all of Japan

[73] Assignee: Hitachi, Ltd., Tokyo, Japan

[21] Appl. No.: 76,427

[22] Filed: Sep. 17, 1979

[30] Foreign Application Priority Data

Sep. 18, 1978 [JP] Japan ............................... 53-126960

[51] Int. Cl.³ .................. G01D 9/42; G02B 7/02; G02B 27/17
[52] U.S. Cl. ............................... 346/108; 350/255; 350/6.6
[58] Field of Search ............... 346/108, 109; 350/255, 350/6.6, 6.8

[56] References Cited

U.S. PATENT DOCUMENTS

| | | | |
|---|---|---|---|
| 1,136,761 | 4/1915 | Becker | 350/255 |
| 3,073,215 | 1/1963 | Fischer | 346/109 |
| 3,900,851 | 8/1975 | Bucy et al. | 346/108 X |
| 3,995,110 | 11/1976 | Starkweather | 350/6.8 X |
| 4,019,804 | 4/1977 | Collier | 350/6.6 |
| 4,040,096 | 8/1977 | Starkweather | 350/6.8 X |
| 4,182,547 | 1/1980 | Siegmund | 350/255 X |

FOREIGN PATENT DOCUMENTS 2111460 9/1971 Fed. Rep. of Germany ............ 350/6.1

*Primary Examiner*—George H. Miller, Jr.
*Attorney, Agent, or Firm*—Craig and Antonelli

[57] ABSTRACT

In a laser beam recording apparatus comprising a laser source, an optical modulator for modulating the intensity of the laser beam from the laser source in response to an electrical signal, an optical scanner for deflecting the modulated laser beam, a recording medium on which the deflected laser beam is recorded, and a optical system for guiding the emitted laser beam from the laser source to recording medium, an automatic focusing device is provided for vibrating a lens or mirror in the optical system in synchronism with the scanning provided by the optical scanner, thereby converging the deflected laser beam into a small spot at any position on the recording medium.

4 Claims, 13 Drawing Figures

LASER RECORDER WITH PIEZOELECTRIC BIMORPH FOCAL LENGTH VIBRATOR

The present invention relates to an information recording apparatus, and more particularly to a laser beam recording apparatus.

A conventional laser beam printer has a construction as shown in FIG. 1. Referring to FIG. 1, laser light emitted from a semiconductor laser 1 is collimated by a lens 102 into a parallel beam which in turn impinges upon an optical scanner 7. In FIG. 1, a galvanomirror type light deflector is used as the optical scanner 7. A scanning signal generated by a scanning signal generator 111 is applied to the optical scanner 7 through an amplifier 114 to scan a photosensitive surface of a recording drum 8 with the laser beam. The drum 8 is rotated in the direction indicated by an arrow so that the entire surface of the recording drum can be scanned with the laser beam. A lens 115, called an F-$\theta$ lens, has such a function of converging the laser beam into a small light spot at that position on the drum 8 corresponding to the deflection angle $\theta$ provided by the optical scanner 7, irrespective of the magnitude of the deflection angle $\theta$. A pattern signal generated from a pattern generating circuit 16 is applied to the semiconductor laser 1 which in turn produces a laser beam output intensity-modulated in accordance with the pattern signal to be stored on the recording drum. However, in order that the F-$\theta$ lens can perform the desired function at any deflection angle given by the optical scanner 7, it must be prepared with a large-sized and large-aperture lens. Therefore, the F-$\theta$ lens has a difficulty in being applied to a small-sized and inexpensive laser beam printer.

An object of the present invention is to provide a laser beam recording apparatus in which a laser beam can be converged into a predetermined small spot on a recording medium without using an F-$\theta$ lens.

Another object of the present invention is to provide a small-sized and inexpensive laser beam recording apparatus.

To that end, a laser beam recording apparatus according to the present invention include vibratile optical means as a focus control device which is displaced along the optical axis in correspondence to various deflection angles of a laser beam provided by an optical scanner, thereby converging the deflected laser beam into a predetermined small spot at any scanning point on a recording drum.

The present invention will be better understood when reading the following detailed description in conjunction with the accompanying drawings, in which;

FIG. 2 shows an embodiment of a laser beam printer according to the present invention, in which a lens is employed as vibratile optical means.

Figure 1:
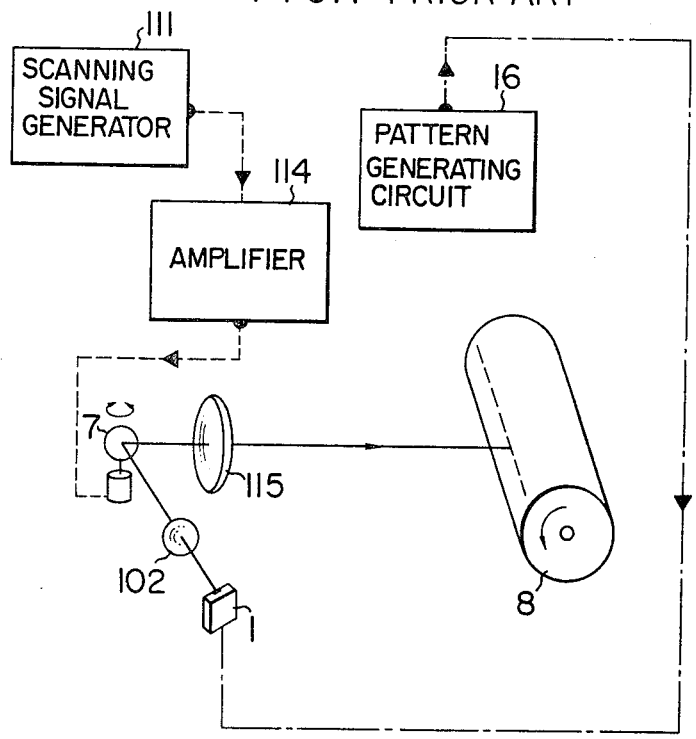
FIG. 1 is a schematic view showing the construction of a conventional laser beam printer.
Figure 2:
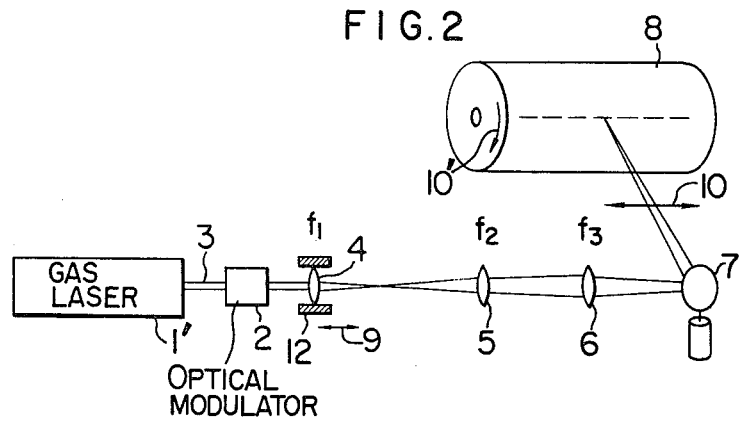
FIG. 2 is a schematic view showing an embodiment of a laser beam printer according to the present invention, in which a lens is used as vibratile optical means and a gas laser is used as the laser source.

Referring to FIG. 2, a laser beam 3 emitted from a gas laser 1' as a laser source is modulated by an optical modulator 2. The modulated laser beam passes through lenses 4, 5 and 6 and then impinges upon a galvanomirror type light deflector 7 as an optical scanner. The optical scanner 7 scans a photosensitive surface of a recording drum 8 with the modulated laser beam in the direction indicated by arrows 10, and the drum 8 is rotated in the direction indicated by an arrow 10'. Thus, optical information can be recorded at the entire area of the photosensitive surface. The lenses 4 and 5 form a beam enlarger to produce an enlarged and collimated beam which impinges on the lens 6. The lens 6 is an imaging or focussing lens which converges the enlarged and collimated beam into a small light spot on the recording drum 8. The focal length of the lenses 4, 5 and 6 is expressed by $f_1$, $f_2$ and $f_3$ respectively.

The lens 4 is provided with vibrating means 12 for displacing the lens 4. The vibrating means 12 displaces the lens 4 in the direction indicated by arrows 9 or along the optical axis so as to focus the laser beam 3 on the recording drum 8, and therefore are hereinafter referred to as an automatic focussing device.

Figure 3:
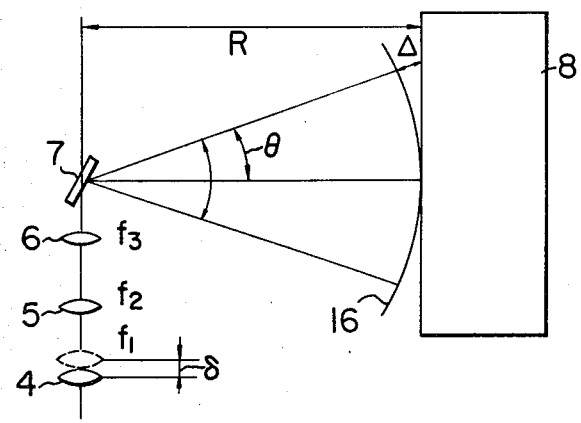
FIG. 3 is a view for explaining the operation of a main part of the embodiment shown in FIG. 2.

FIG. 3 is a view for explaining the operation of the automatic focussing device 12. Referring to FIG. 3, in the case where the lens 4 is not provided with the automatic focussing device, a light spot formed by the imaging lens 6 is positioned on the circumference of a circle with its center at the galvanomirror type light deflector 7. Accordingly, the position of the light spot is deviated from the photosensitive surface of the drum 8 by an amount $\Delta$. Such a deviation of converging position makes it impossible to record information on the recording drum with high quality. If the distance between the optical scanner 7 and the recording drum 8 is expressed by R, the deviation $\Delta$ is given by the following equation:

$$\Delta = R(\frac{1}{\cos \theta} - 1) \tag{1}$$

Since $\theta$ is a function of time, $\Delta$ is also a function of time.

The automatic focussing device of the present invention compensates the deviation $\Delta$ of converging position by slightly displacing the lens 4 in synchronism with the optical scanning of the optical scanner, thereby converging the laser beam into a small light spot at any position on the recording drum. The optimal small displacement $\delta$ of the lens 4 provide by the automatic focussing device is as follows:

$$\delta = (f_2/f_3)^2 \Delta \tag{2}$$

In the above description, explanation has been made with respect to the case of displacing the lens 4. Alternatively, similar results can be obtained by displacing the lens 5.

Figure 4:
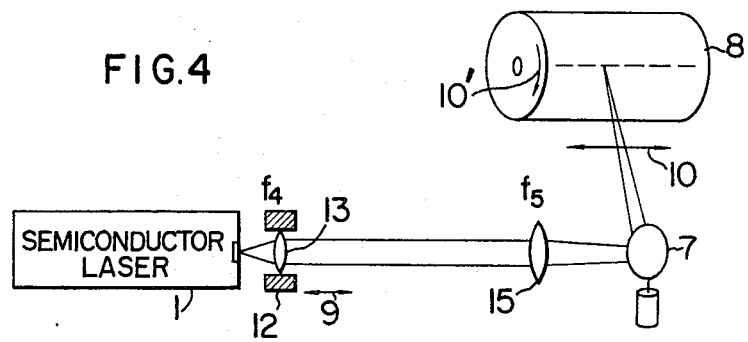
FIG. 4 is a schematic view showing another embodiment of a laser beam printer according to the present invention, in which a semiconductor laser is used as the laser source.

FIG. 4 shows another embodiment of the present invention, in which a semiconductor laser 1 is employed as a laser source. In FIG. 4, reference numeral 13 denotes a lens which collimates a laser beam from the semiconductor laser 1 into a parallel beam to guide it to the photosensitive surface of the recording drum 8, and numeral 15 denotes an imaging lens which converges the collimated beam into a small spot at any position on the recording drum 8. The lens 13 is provided with the automatic focussing device 12 so that the lens 13 can be displaced in the direction indicated by arrows 9.

Though in FIG. 4 the lens 13 is provided with the automatic focussing device, the device may be mounted on the semiconductor laser 1 instead of the lens 13.

When the luminous point of the semiconductor laser 1 has a diameter of 1 μm and the small light spot to be formed on the recording drum 8 has a diameter of 100 μm, a ratio $f_5/f_4$ is about 100, where $f_4$ and $f_5$ designate focal lengths of the lenses 13 and 15 respectively.

In this case, the relation between the deviation Δ of converging position and the displacement δ of the lens 13 provided by the automatic focussing device is given by the following equation:

$$\delta = (f_4/f_5)^2 \Delta \tag{3}$$

For example, the lens has to be displaced by δ=1 μm at a time when the deviation Δ is 10 mm.

The vibrating means as the automatic focussing device includes well-known means such as a voice coil (formed of a coil and a permanent magnet), a magnetostriction element, an electrostriction element and a piezoelectric element.

Figure 5A:
FIGS. 5A to 5C show waveforms for explaining the operation of an automatic focussing device according to the present invention.
Figure 5B:
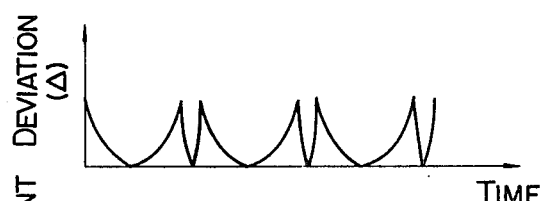
Figure 5C:
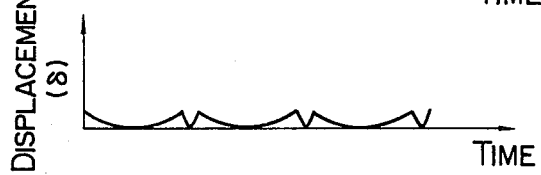

FIG. 5A shows a case where the deflection angle θ of light given by the galvanomirror type light deflector has a saw-tooth waveform. In this case, the deviation Δ of converging position shown in FIG. 3 exhibits a waveform as shown in FIG. 5B. In order to eliminate this deviation Δ, the automatic focussing device provides a displacement δ as shown in FIG. 5C, in accordance with the equation (2) or (3).

As described above, the automatic focussing device prevents the formation of a blurred image on the recording drum 8 due to the deviation Δ of focussing position, thereby enabling the laser beam to be converged into a desired small spot on the recording drum.

Figure 6:
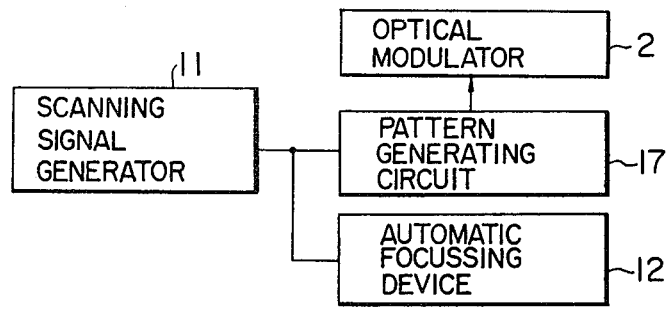
FIG. 6 is a block diagram showing a control system employed in the present invention.

FIG. 6 shows a control system which may be employed in the embodiment of FIG. 2. In synchronism with a scanning signal waveform which is generated by a scanning signal generator 11 to drive the optical scanner 7, the automatic focussing device 12 is driven in such a manner as shown in FIGS. 5A to 5C, and a pattern generating circuit 17 generates a pattern signal for recording information on a desired position of the recording drum. The pattern signal is applied to the optical modulator 2. In the case where a semiconductor laser is employed as a laser source as shown in the embodiment of FIG. 4, the pattern signal is applied to a driving circuit for the semiconductor laser 1 in place of the optical modulator.

The foregoing description has been made with respect to a case where a lens is used as vibratile optical means which is capable of being displaced by the automatic focussing device. However, the present invention is not limited to such a case, but a mirror may be used as the vibratile optical means.

Figure 7:
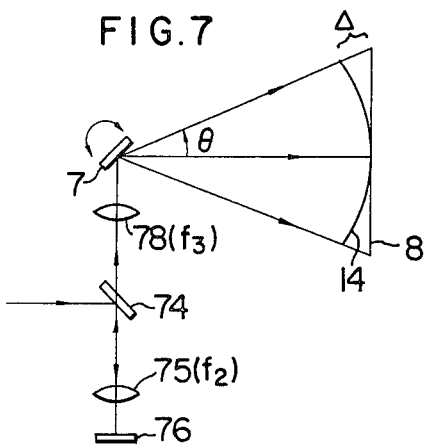
FIGS. 7 and 8 are views for explaining the principle of a further embodiment of a laser beam printer according to the present invention, in which a mirror is used as vibratile optical means.
Figure 8:
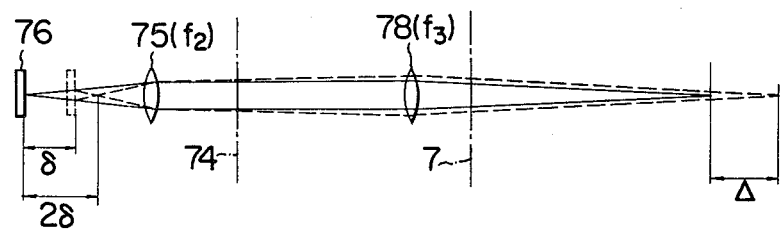

FIGS. 7 and 8 are views for explaining a further embodiment of the present invention, in which a mirror is used as vibratile optical means. Referring to FIG. 7, a collimated laser beam is reflected by a half-mirror 74 and then impinges upon a mirror 76 through a lens 75 (with focal length $f_2$). The laser beam reflected back from the mirror 76 impinges upon an optical scanner 7 through the lens 75, the half-mirror 74 and a lens 78 (with focal length $f_3$). The mirror 76 is positioned in the vicinity of the focal point of the lens 75. In the case where the mirror 76 does not vibrate, the scanning laser beam is imaged or converged on a circumference 14 of a circle with its center at the optical scanner 7, and therefore the converging position is deviated from the photosensitive surface of the recording drum 8 by an amount Δ. In order to eliminate such a deviation Δ of converging position, it is necessary to displace the mirror 76. When the deflection angle of the laser beam is expressed by θ and the distance between the optical scanner and the photosensitive surface of the recording drum is expressed by R, the deviation Δ is given by the following equation:

$$\Delta = R(\frac{1}{\cos \theta} - 1) \tag{4}$$

When the deflection angle θ is small, the deviation Δ can be approximated as follows:

$$\Delta \approx (R/2)\theta^2 \tag{5}$$

Now, explanation will be made on a relation between the deviation Δ of converging position and the displacement δ of the mirror 76 by reference to FIG. 8. When the displacement δ is equal to zero, the laser beam reflected back from the mirror 76 positioned at the focal point of the lens 75 is collimated by the lens 75 into a parallel beam as indicated by solid lines and is thereafter converged into the focal point of the lens 78. On the other hand, when the mirror 76 is displaced by an amount δ as indicated by broken lines in FIG. 8, the converging point of the lens 75 is shifted by 2δ. Accordingly, the laser beam having passed through the lens 75 becomes a divergent beam which in turn passes through the lens 78 and is converged into a point distanced from the focal point of the lens 78 by the amount Δ. The relation between the displacement δ and the deviation Δ is given by the following equation on the basis of the formula of longitudinal magnification:

$$\delta = \tfrac{1}{2}(f_2/f_3)^2 \Delta \tag{6}$$

Accordingly, the following relation between the displacement δ and the deflection angle θ can be obtained from the equations (6) and (4):

$$\delta = \frac{R}{2}(\frac{f_2}{f_3})^2 (\frac{1}{\cos \theta} - 1) \tag{7}$$

When the deflection angle θ is small, the displacement δ can be approximated as follows:

$$\delta = (R/4)(f_2/f_3)^2 \theta^2 \tag{8}$$

It should be understood that the deviation Δ of converging position can be eliminated by displacing the mirror 76 by an amount δ corresponding to a deflection angle θ, that is, an amount δ given by the equation (7) or (8), and thus the deflected laser beam can be converged into a small spot at any point on a photosensitive surface of a drum.

Figure 9:
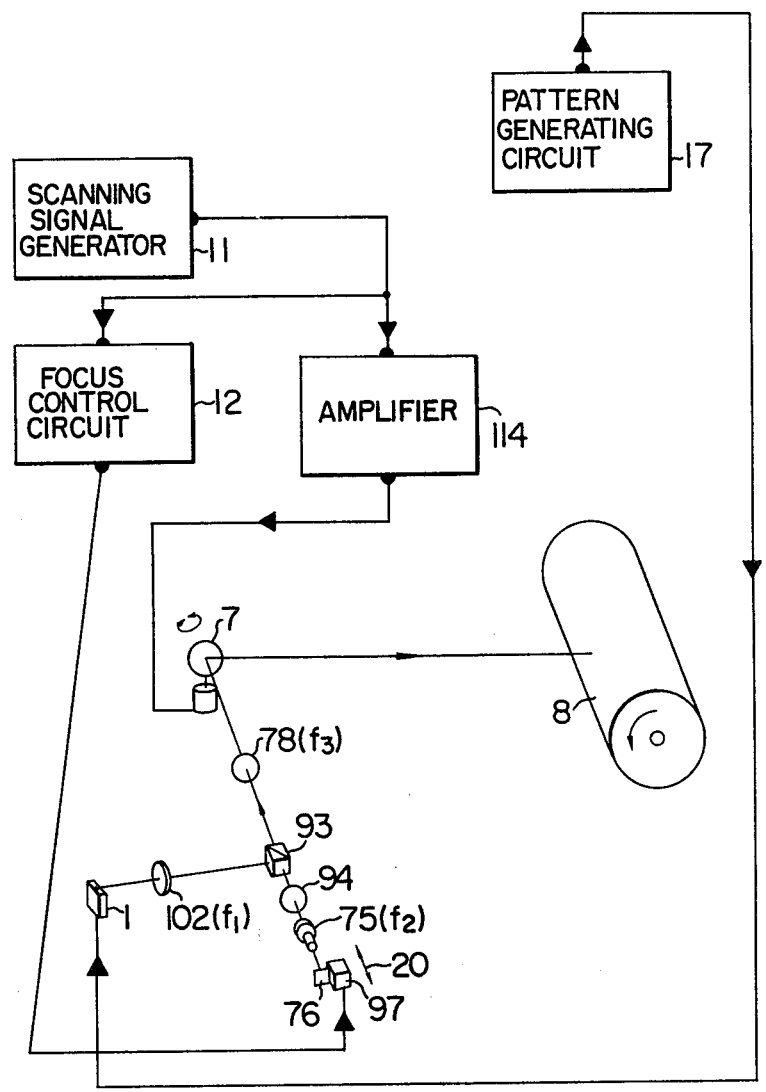
FIG. 9 is a schematic view showing a still further embodiment of a laser beam printer according to the present invention, in which a polarizing prism and a quarter wavelength plate are used.

FIG. 9 is a schematic view showing a still further embodiment of a laser beam printer according to the present invention. Referring to FIG. 9, a laser beam emitted from a semiconductor laser 1 is collimated by a lens 102 into a parallel beam. In this embodiment, a polarizing prism 93 and a quarter wavelength plate 94 are employed in place of the half-mirror 74 shown in FIG. 7, in order to utilize the laser beam to the fullest. That is, a polarized laser beam is totally reflected from the polarizing prism 93 and then reflected from a mirror 76 to the polarizing prism 93. In this optical path, the laser beam twice passes through the quarter wavelength plate 94. Since the laser beam having twice passed through the quarter wavelength plate 94 has the directon of polarization crossed with that of the initial laser beam, it can transmit through the polarizing prism 93 to reach an optical scanner 7. Lenses 75 and 78 have the same function as the lenses 75 and 78 shown in FIG. 7 respectively.

A vibrating element 97 serving as an automatic focussing device displaces the mirror 76 in the direction indicated by arrows 20, that is, in the direction parallel to the optical axis. A focus control circuit 12 for driving the vibrating element 97 converts a scanning signal of a scanning signal generator 11 into a control signal on the basis of an appropriate function relation to apply the control signal to the vibrating element 97.

Figure 10:
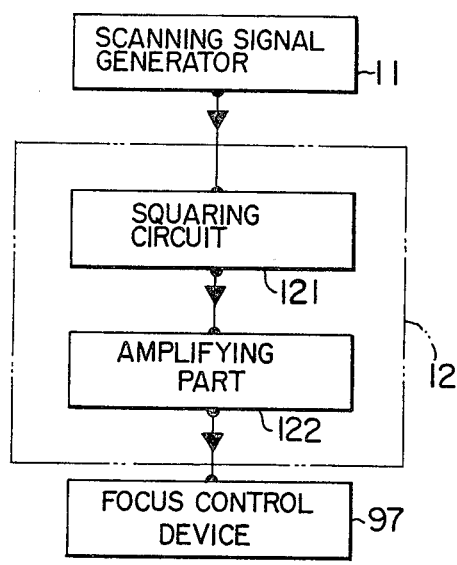
FIG. 10 is a block diagram showing the construction of a focus control circuit used in the present invention.

A circuit arrangement in the case where the mirror 76 is displaced in proportion to the deflection angle in accordance with the equation (8) is shown in FIG. 10. Referring to FIG. 10, when the scanning signal generator 11 produces a signal whose amplitude is proportional to the deflection angle $\theta = \theta(t)$, a squaring circuit 121 delivers an output signal having its amplitude proportional to $\theta^2$. In an amplifying part 122, the amplification factor for the output signal from the squaring circuit 121 is adjusted to obtain a desired coefficient of $\theta^2$ for driving the focus control device 97 in accordance with the equation (8).

Figure 11:
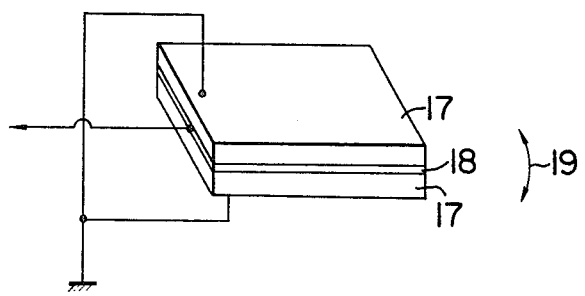
FIG. 11 is a view showing an example of vibrating elements which may be used in the present invention.

Various elements such as a piezoelectric element, a voice or moving coil, a magnetstriction element and an electrostriction element can be employed as the vibrating means. A piezoelectric bimorph element is preferable because of its excellent frequency response. FIG. 11 shows a piezoelectric bimorph element suitable for use in the present invention. Referring to FIG. 11, a reinforcing plate 18 made of, for example, phosphorbronze is sandwiched between a pair of piezoelectric ceramic plates 17 made of, for example, PZT (lead zirconatetitanate). Each of the piezoelectric ceramic plates is provided with an electrode over its surface. When a voltage is applied between these electrodes and the phosphor-bronze plate 18, the element is displaced or vibrates in the direction indicated by arrows 19.

In the embodiment shown in FIG. 9, the galvano-mirror type light deflector is employed as the optical scanner. However, a rotatable polygonal mirror may be employed.

Further, it should be understood that the present invention is also applicable to a laser beam printer using any laser source other than the semiconductor or gas laser as described. Though there has been shown only a case where the optical scanning is linearly conducted on the surface of a drum, the present invention is also applicable to a case where the optical scanning is made on plane, curved or uneven surfaces. Furthermore, though the embodiments of the present invention have been described with respect to laser beam printers, the present invention is also applicable to various apparatuses which necessitate laser beam scanning, specifically laser beam scanning in a wide range of deflection angle.

As has been explained hereinbefore according to the present invention, a deflected laser beam can be converged into a predetermined spot size on a scanning surface for any deflection angle, thereby enabling the recording of information with high accuracy and high quality. Further, realized, and a light, small-sized information storage apparatus can be provided the apparatus can be realized with a small-sized and inexpensive structure.

What is claimed is:

1. In an information recording apparatus comprising a laser source for emitting a laser beam, an optical scanner for deflecting said laser beam at a predetermined deflection angle, recording means having a surface on which the deflected laser beam is recorded, and optical means for guiding to the surface of said recording means said laser beam emitted from said laser source, the improvement in that said optical means includes at least one optical element attached to a piezoelectric bimorph element, said piezoelectric bimorph element being driven by drive means which generates a predetermined electric signal for displacing said optical element in correspondence to the deflection angle of the laser beam deflected by said optical scanner, whereby the deflected laser beam is converted into a predetermined small light spot at any position on the surface of said recording means.

2. An information recording apparatus according to claim 1, wherein said optical element includes a mirror and said mirror is positioned in the vicinity of a converging point of the laser beam by said optical means which is in an optical path between said laser source and said optical scanner.

3. An information recording apparatus according to claim 1, wherein said optical element includes a lens.

4. An information recording apparatus according to claim 1, wherein said drive means includes a squaring circuit for generating the predetermined electric signal.

* * * * *

UNITED STATES PATENT AND TRADEMARK OFFICE
CERTIFICATE OF CORRECTION

PATENT NO. : 4,274,101
DATED : June 16, 1981
INVENTOR(S) : Keiji KATAOKA et al

It is certified that error appears in the above—identified patent and that said Letters Patent is hereby corrected as shown below:

Title Page

Left Hand Column:

Please delete the priority application number "53-126960" and insert --53-126960(U)--.

Signed and Sealed this

Fifteenth Day of December 1981

[SEAL]

Attest:

GERALD J. MOSSINGHOFF

Attesting Officer    Commissioner of Patents and Trademarks